(No Model.) 2 Sheets—Sheet 1.

H. M. ASHLEY.
MACHINERY FOR MAKING GLASS BOTTLES, &c.

No. 403,027. Patented May 7, 1889.

Witnesses.

Inventor.
Howard Mattravers Ashley.

(No Model.) 2 Sheets—Sheet 2.

H. M. ASHLEY.
MACHINERY FOR MAKING GLASS BOTTLES, &c.

No. 403,027. Patented May 7, 1889.

Witnesses
Inventor,
Howard Mathews Ashley.

UNITED STATES PATENT OFFICE.

HOWARD MATRAVERS ASHLEY, OF FERRYBRIDGE, COUNTY OF YORK, ENGLAND.

MACHINERY FOR MAKING GLASS BOTTLES, &c.

SPECIFICATION forming part of Letters Patent No. 403,027, dated May 7, 1889.

Application filed November 10, 1888. Serial No. 290,512. (No model.)

*To all whom it may concern:*

Be it known that I, HOWARD MATRAVERS ASHLEY, a subject of the Queen of Great Britain and Ireland, and a resident of Ferrybridge, in the county of York, England, have invented a new and useful Improvement in Machinery for Making Bottles and other Like Hollow Glassware, of which the following is a specification.

This invention is additional to a series of improvements in processes and apparatus for making bottles and like hollow glassware by machinery, which I have set forth in previous specifications, forming part of an application for United States Letters Patent, filed September 26, 1887, Serial No. 250,767, and divisions thereof.

The present invention consists in an improved single machine adapted to be conveniently worked by the man or boy in charge of the same, and embodying certain novel combinations of parts, as hereinafter set forth and claimed.

Two sheets of drawings accompany this specification as part thereof.

Figure 1:
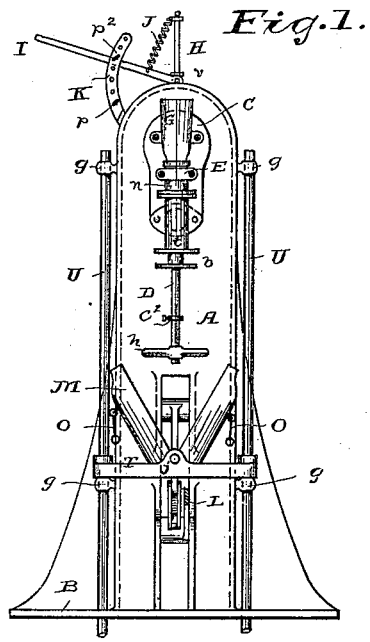
Figure 2:
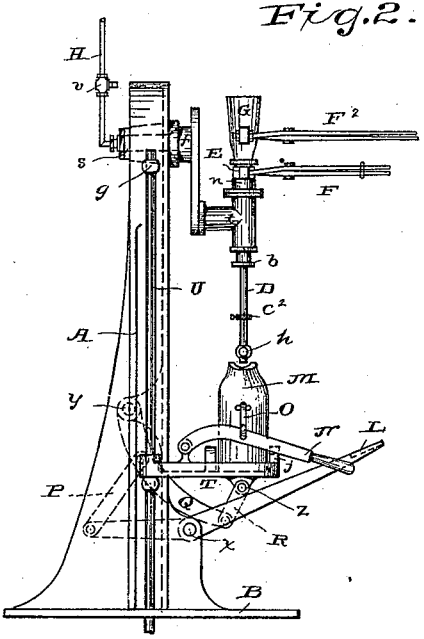
Figure 3:
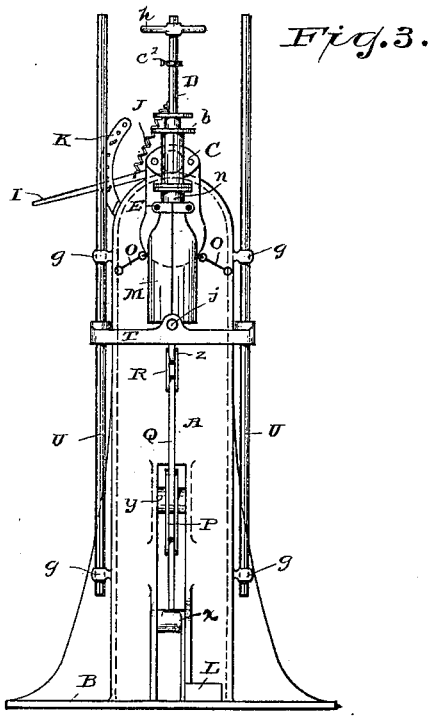
Figure 4:
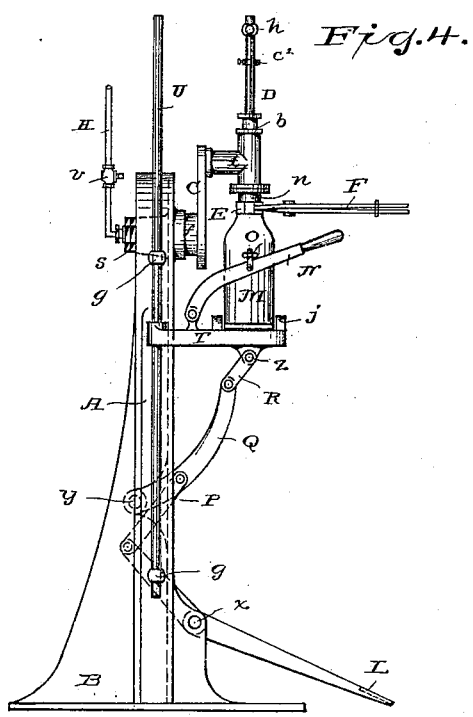
Figure 5:
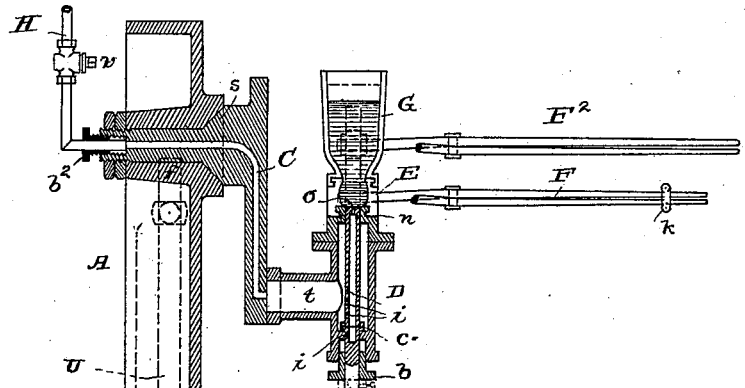
Figure 7:
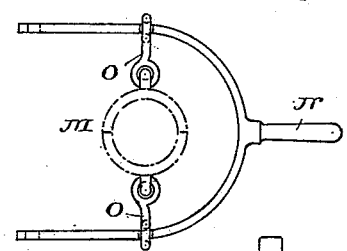
Figure 8:
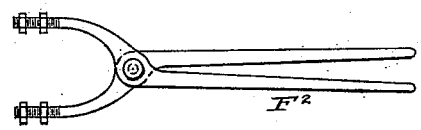
Figure 6:
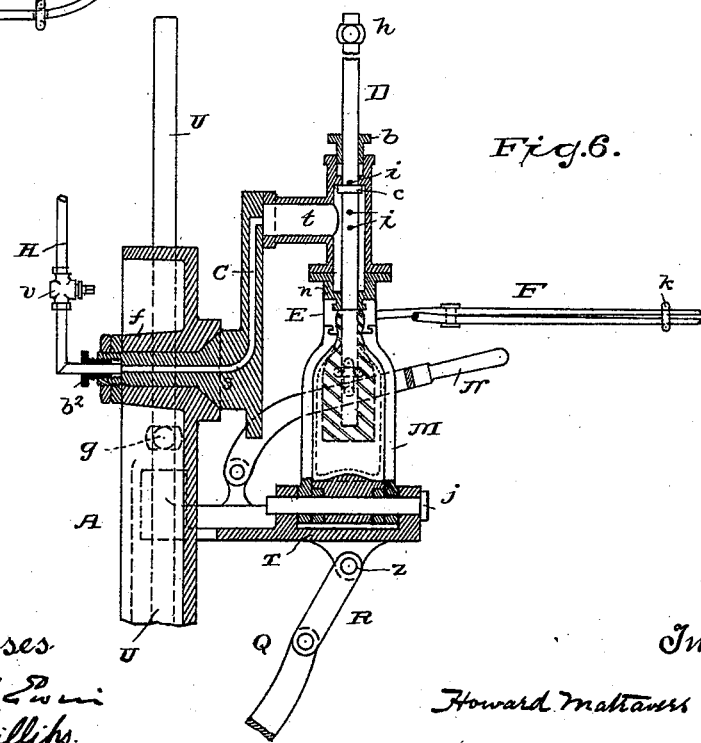

Figures 1 and 2 of the drawings represent front and side views of a "single" bottle-machine illustrating this invention. Figs. 3 and 4 represent like views of the same as it appears at a later stage of the process. Fig. 5 represents a vertical section through the upper part of the machine as represented in Figs. 1 and 2, on a larger scale, illustrating the parison-making operations. Fig. 6 represents a like section through the upper part of the machine as represented in Figs. 3 and 4, illustrating the completion of the process. Figs. 7 and 8 are detail top views of the bottle-mold-closing devices and the parison-mold tongs, respectively. In Figs. 1 and 3 and in Figs. 2 and 4, respectively, certain parts are omitted that are fully shown by the other views.

Like letters of reference indicate corresponding parts in the several figures.

The upright "frame" of this machine consists conveniently of a single casting comprising a standard, A, and a foot or base, B, the former being recessed and braced for the requisite stiffness without unnecessary weight, and so constructed as to afford or support bearings or guides for the several moving parts.

Near its upper end and perpendicular to its face the standard A is provided with a horizontal faucet-bearing, $f$, to which is fitted a spigot, $s$, that is the coupling part and pivot of an invertible hollow arm, C, which terminates in a tubular T-piece, $t$. The latter is bolted fast to the arm proper in continuation thereof and of its interior, and is provided with a nozzle, $n$, and a stuffing-box, $b$, at the respective ends of its normally-vertical portion.

The stem of a hollow punch, D, works through said stuffing-box $b$, and is provided with a suitable handle, $h$, by which to reciprocate it. The bore of the punch is conveniently confined to a portion of its length, as shown in Fig. 5, and terminates at the face of the punch in a contracted outlet, $o$—say one-eighth of an inch in diameter—the small size of which suffices to exclude molten glass in making small-mouthed bottles. For making bottles with larger mouths the duplex hollow punch set forth and claimed in one of said previous specifications is preferred. A coupling, $c$, between the punch proper and its stem, or an equivalent stop-collar within the T-piece, limits the retraction of the punch. Its projection into the parison is preferably limited by an adjustable stop, such as the collar with set-screw, (represented at $c^2$.) Inlet-holes $i$, in sufficient number, are so located as to preserve communication between the interior of the arm C and that of the punch D, when the latter is projected, as well as while it is retracted.

The extremity of the nozzle $n$, or the nozzle proper, is undercut or provided with a peripheral groove, and is embraced by a divided head-mold or collar, E. The interior of this collar at one end is fitted to the circumference of the nozzle, and the remainder thereof is adapted to mold the head of the bottle as to external shape. The face of the lip is shaped by the face of the nozzle $n$, which may be lathe-turned or cut to any required configuration.

The collar E is handled by tongs F, to the respective jaws of which the parts of the collar are suitably attached, as by perforated lugs on said parts and screw-threaded extremities of the tongs-jaws provided with pairs of nuts. A keeper, $k$, applied to the handles of the tongs, fastens the collar in place. Similar tongs, $F^2$, (shown detached in plan by Fig. 8,) carry a parison-mold, G, having a neck end which embraces and fits a circumferentially-grooved end (or the like) on the collar E, and is otherwise adapted, as to its interior, to facilitate measuring or gaging the proper quantity of glass for bottles of a given size and shape. In order to avoid unnecessary thickness of the walls of the bottle at its shoulders, the interior of the parison-mold is first made quite narrow at the shoulders, and is enlarged there, as may be required after testing, until the desired result is obtained. The relative diameter at the shoulders usually required gives the parison-mold a tapering form, as represented; but for very square-shouldered bottles a cylindrical parison-mold is preferable.

A stuffing-box, $b^2$, at the rear end of the spigot $s$, admits the smooth terminal end of a pipe, H, supplied with a gaseous fluid, as air under pressure, hereinafter spoken of as air, and provided with a flow-controlling valve, $v$. A simple spigot-valve is represented in the drawings. To facilitate operating it, a hand-lever, I, Figs. 1 and 3, is applied to the square of the spigot, a spiral spring, J, is stretched thereto from a fixed support above, and a pair of stop-pins, $p$ $p^2$, adjustable in a series of holes, $q$, in a sector, K, for example, conveniently limit the depression of the lever to increase the flow of the air, and its retraction to reduce the flow.

With the lever I in its upper position, as represented in Fig. 1, there is preferably a slight escape of air through the punch D, so that when the latter is thrust upward into the parison, as illustrated by dotted lines in Fig. 5, and immediately withdrawn, any vacuum in the glass is prevented.

The arm C, together with the attached collar E, parison-mold G, and their tongs, is now reverted, and the parison-mold is then opened by its tongs $F^2$ and removed. The hollow parison, suspended by the collar E, is next permitted to elongate by gravity, and its extremity is chilled or stiffened by catching it on a paddle, as set forth in one of said previous specifications. Finally, by means of the treadle L and suitable connections, an open shaping-mold, M, having its neck end constructed of the same internal shape and size as that of the parison-mold G, is elevated from beneath, so that said neck end will coincide with said externally-grooved end of the collar E, (then its lower end,) and the mold M is closed by means of a bifurcated hand-lever, N, and toggle-links O, so as to embrace said end of the collar and the depending body of the parison. The lever I is depressed to admit a proper blast of air, and the bottle is thus finished, as illustrated by Figs. 3, 4, and 6.

The blown bottle is represented by dotted outline in Fig. 6. The mold M is then opened and lowered and the collar E is opened and detached, to release the bottle, which may be transferred from the machine to the annealing-oven in any approved way. The arm C is then again inverted, the collar E is reattached by the tongs F, the parison-mold G, or preferably a cooler duplicate, is attached by means of its tongs, $F^2$ and, the lever I being already retracted by its spring J, another charge of molten glass is poured into the parison-mold, and so on as before.

The particular treadle L shown in the drawings has a fixed fulcrum, $x$, at the front of the standard A, a short distance above the base B, and a rearward extension, the extremity of which is connected by a link or pair of links, P, with a lever-arm, Q, which has a fixed fulcrum, $y$, at its rear end, and is connected by a link or pair of links, R, with a depending lug, $z$, on the bottom of a table, T, which carries the mold M. Pivotal bolts or pins connect the parts and form the fulcrum-pivots in customary manner. The mold M is diametrically divided, except its bottom, and its sides are hinged to the latter and attached to the table T by a suitable hinge-joint, as $j$. (Best seen in Fig. 6.) Parallel vertical guide-rods U, carried by the table T, work in guides $g$ at the sides of the standard A.

Details of construction and procedure which have not been specified may be of any approved description, and I do not limit my claims to bottle-machines nor to any parts or details that are not essential to the respective combinations.

Having thus described said single machine as a whole, I claim as my invention, and desire to patent under this specification—

1. In a machine for making bottles and other like hollow glassware, the combination, substantially as hereinbefore specified, of a suitable support, an invertible part connected therewith by a horizontal pivot and terminating at one end in a nozzle having an external circumferential groove or the like, a suitably-divided head-mold or collar fitted to said nozzle and having an external circumferential groove or the like at its opposite end, and interchangeable parison and shaping molds fitted internally to the latter at their neck ends, whereby a proper alignment of the parts is insured and the parison-mold is adapted to be held in place and suspended by the attached neck-mold during and after the reversion of the parison.

2. In a machine for making bottles and other like hollow glassware, the combination, with a nozzle and interchangeable parison and shaping molds, of a diametrically-divided head mold or collar provided with tongs having jaws attached to the respective halves of the collar, substantially as hereinbefore specified.

3. In a machine for making bottles and other like hollow glassware, the combination, with a head-mold or collar, of a diametrically-divided parison-mold fitted at its neck end to embrace said collar and provided with tongs having jaws attached to the respective halves of said mold, substantially as hereinbefore specified.

4. In a machine for making bottles and other like hollow glassware, the combination, with a suitable nozzle, a head-mold or collar, and a parison-mold, of an axial punch sliding through said nozzle and provided with a fixed stop to limit its retraction and an adjustable stop to regulate its insertion into the inverted parison, substantially as hereinbefore specified.

5. In a machine for making bottles and other like hollow glassware, the combination, substantially as hereinbefore specified, of a suitable support, an elevated invertible part connected therewith by a horizontal pivot, a nozzle and a head-mold or collar depending from said part in its reverted position, a divided parison-mold depending from said collar and having laterally-moving parts, and a vertically-moving shaping-mold that is normally beneath the plane of the depending parison-mold.

6. In a machine for making bottles and other like hollow glassware, the combination, substantially as hereinbefore specified, of a suitable support, an elevated invertible part connected therewith by a horizontal pivot, a nozzle and a head-mold or collar depending from said part in its reverted position, a divided parison-mold depending from said collar and having laterally-moving parts, a vertically-moving shaping-mold that is normally beneath the plane of the depending parison-mold, and a treadle and suitable mechanical connections for elevating the shaping-mold to inclose the suspended parison.

7. In a machine for making bottles and other like hollow glassware, the combination of a hollow punch, a suitable nozzle through which it works, a hollow T-piece to which said nozzle is attached, suitable hollow connections, a pipe supplied with a gaseous fluid, as air under pressure, and provided with a suitable valve, a hand-lever working said valve, a spring holding said lever normally in an elevated position, and a pair of adjustable stops for regulating the limits of the motion of the lever, substantially as hereinbefore specified.

HOWARD MATRAVERS ASHLEY.

Witnesses:
FRANCIS FORBES,
JAS. L. EWIN.